(12) United States Patent
Dutta

(10) Patent No.: US 11,122,057 B2
(45) Date of Patent: Sep. 14, 2021

(54) SYSTEMS, METHODS AND COMPUTER PROGRAM PRODUCTS FOR INGRESS EMAIL SECURITY

(71) Applicant: OPEN TEXT HOLDINGS, INC., San Mateo, CA (US)

(72) Inventor: Amitava Dutta, Plainsboro, NJ (US)

(73) Assignee: OPEN TEXT HOLDINGS, INC., San Mateo, CA (US)

(*) Notice: Subject to any disclaimer, the term of this patent is extended or adjusted under 35 U.S.C. 154(b) by 213 days.

(21) Appl. No.: 16/112,294

(22) Filed: Aug. 24, 2018

(65) Prior Publication Data

US 2019/0075121 A1 Mar. 7, 2019

Related U.S. Application Data

(60) Provisional application No. 62/553,185, filed on Sep. 1, 2017.

(51) Int. Cl.
*H04L 29/06* (2006.01)
*H04L 29/08* (2006.01)
*H04L 12/58* (2006.01)

(52) U.S. Cl.
CPC .......... *H04L 63/126* (2013.01); *H04L 51/12* (2013.01); *H04L 51/22* (2013.01); *H04L 63/0236* (2013.01); *H04L 63/101* (2013.01); *H04L 63/102* (2013.01); *H04L 63/123* (2013.01); *H04L 67/14* (2013.01)

(58) Field of Classification Search
CPC ... H04L 63/126; H04L 63/0236; H04L 51/12; H04L 63/101; H04L 63/123; H04L 67/14; H04L 51/22; H04L 63/102
See application file for complete search history.

(56) References Cited

U.S. PATENT DOCUMENTS

| | | | |
|---|---|---|---|
| 7,249,175 B1 * | 7/2007 | Donaldson | G06Q 10/107 709/206 |
| 7,263,607 B2 * | 8/2007 | Ingerman | G06Q 10/107 709/245 |

(Continued)

OTHER PUBLICATIONS

"Using Spamhaus BGPf in a Production Environment," The Spamhaus Project, Geneva Switzerland, Apr. 2013, 7 pages.

*Primary Examiner* — Oleg Korsak
*Assistant Examiner* — Feliciano S Mejia
(74) *Attorney, Agent, or Firm* — Sprinkle IP Law Group

(57) ABSTRACT

An ingress server is operable to perform, through a multi-list evaluator, two different validations: one utilizes a sender network address of a sender's server to determine whether to trust, accept, or reject a connection and one utilizes a domain of a sender email address from an envelope to determine whether to accept or reject a message. The multi-list evaluator may perform the validations in two phases. If a connection can be trusted, the connection is accepted and any message over the connection (in a single session) is accepted and no further validation is necessary. Further, in both phases, the multi-list evaluator can utilize a whitelist maintained by the ingress server to override a blacklist provided by a blacklist supplier. This override can reduce false-positives and drastically reduce delays usually associated with correcting false-positives and improve system throughput.

20 Claims, 6 Drawing Sheets

(56) References Cited

U.S. PATENT DOCUMENTS

| | | | | |
|---|---|---|---|---|
| 7,676,566 B2* | 3/2010 | Lund | ............... | G06Q 10/107 |
| | | | | 709/204 |
| 7,698,369 B2* | 4/2010 | Addante | ............ | H04L 51/26 |
| | | | | 709/206 |
| 7,788,359 B2* | 8/2010 | Lund | ............ | H04L 51/12 |
| | | | | 709/223 |
| 7,822,977 B2* | 10/2010 | Katsikas | ........ | H04L 63/0281 |
| | | | | 713/162 |
| 7,849,142 B2* | 12/2010 | Clegg | ............ | H04L 51/12 |
| | | | | 709/206 |
| 8,782,753 B2* | 7/2014 | Lunt | ............ | H04L 51/12 |
| | | | | 726/4 |
| 8,874,770 B2* | 10/2014 | Ruff | ............ | H04W 12/0808 |
| | | | | 709/229 |
| 8,886,728 B2* | 11/2014 | Wood | ............ | G06Q 10/107 |
| | | | | 709/206 |
| 8,997,232 B2* | 3/2015 | Be'ery | ............ | H04L 63/30 |
| | | | | 726/23 |
| 10,362,047 B2* | 7/2019 | Lowry | ............ | H04L 51/12 |
| 2009/0300128 A1* | 12/2009 | Trupp | ............ | H04L 63/08 |
| | | | | 709/206 |
| 2010/0251329 A1* | 9/2010 | Wei | ............ | H04L 63/1416 |
| | | | | 726/1 |
| 2015/0032827 A1* | 1/2015 | Tyler | ............ | H04L 51/16 |
| | | | | 709/206 |
| 2018/0375877 A1* | 12/2018 | Jakobsson | ........ | G06F 16/955 |
| 2019/0052655 A1* | 2/2019 | Benishti | ............ | H04L 51/34 |
| 2020/0067861 A1* | 2/2020 | Leddy | ............ | H04L 51/12 |

* cited by examiner

SYSTEMS, METHODS AND COMPUTER PROGRAM PRODUCTS FOR INGRESS EMAIL SECURITY

CROSS-REFERENCE TO RELATED APPLICATION(S)

This application claims a benefit of priority under 35 U.S.C. § 119(e) from U.S. Provisional Application No. 62/553,185, filed on Sep. 1, 2017, entitled "SYSTEMS, METHODS AND COMPUTER PROGRAM PRODUCTS FOR INGRESS EMAIL SECURITY," the entire disclosure of which is fully incorporated by reference herein for all purposes.

TECHNICAL FIELD

This disclosure relates generally to email processing at ingress servers. More particularly, this disclosure relates to systems, methods, and computer program products for ingress email security.

BACKGROUND OF THE RELATED ART

Server computers operating in networked computing environments can be infected by malicious software (malware) that come in through emails along with regular network traffic. Malware can come from many sources, typically from remote servers operated by cyber attackers. Once a server computer in a computer network is infected, it can be instructed, for example, by instructions embedded in the malware or by a remote network server operated by a cyber attacker, to steal confidential and/or sensitive information such as credit card numbers, bank account numbers, etc., to disable and/or interrupt network services usually provided by the server computer, to lock up and hold data on the server computer hostage for ransom, or otherwise to cause harm to the server computer and/or the computer network where the server computer operates.

These types of network security threats can be mitigated, to a certain extent, by listing sources of known malware on a blacklist. In computing, a blacklist or block list is an access control mechanism that can be used by a firewall or a network security system to deny external systems access to a protected computer network.

Blacklists can be applied at various points in a security architecture. Examples of security checkpoints can include network hosts, web proxy servers, Domain Name System servers, email servers, firewalls, directory servers, authentication servers, etc.

The use of blacklists, while effective in some cases, can be problematic in other cases. For instance, suppose user A forwards an email to user B. However, user A's email address is spammed, so the email from user A is a spam mail. However, user A's email server is unaware of this and forwards the email to user B's email server. User B's email server determines that the email is a spam and flags the Internet Protocol (IP) address of user A's email server for sending spam. User A's email server is now "blacklisted" on a public blacklist server, even though user A's email server is not a malicious server operated by a spammer. Suppose user A's email is first sent to a relay server. User B's email server may flag the IP address of the relay server for relaying the spam message, even though the email was not originated from the relay server and the relay server is not a malicious server operated by a spammer. These examples illustrate that it is not uncommon for an email address from a non-malicious source to end up on a public blacklist. That is, when blacklists are used as a security measure against email traffic, the false-positive rate can be quite high.

SUMMARY OF THE DISCLOSURE

When an email server's IP address is inadvertently placed on a blacklist, by a public or private blacklist provider system, one recourse is to contact the administrator or operator of the blacklist provider system and request the server IP address be de-listed from the blacklist. This is a process that can take weeks or even longer if the email server's IP address is mistakenly added to multiple blacklists. This delay can disrupt services provided by the email server and severely impact the performance of the email server.

What is needed, therefore, is an ingress email security solution that can mitigate and/or avoid such disruptions. Embodiments disclosed herein can address this need and provide additional technical solutions and benefits.

An object of the invention is to provide improved ingress email security at a server computer (referred to as an "ingress server") that receives incoming messages such as emails from computer systems operating outside of a computer network, for instance, an enterprise computing environment or a private computer network. In some embodiments, this object can be realized in a specially programmed mail filter (which can be referred to as a "milter") that works in conjunction with a mail transfer agent (MTA) at an ingress server. In some embodiments, the mail filter includes a new multi-list evaluator.

In some embodiments, a method of processing an incoming message (e.g., an email) received from a sender system over a Simple Mail Transfer Protocol (SMTP) can comprise a two-phase processing. In the first phase, the multi-list evaluator runs the IP address of the sender server (referred to as the sender network address, obtained by the MTA agent from the sender's network system) through a series of matches and determines whether the message can be trusted, accepted but not trusted, or rejected. If the sender network address is determined to be trusted during the first phase (e.g., the sender network address is on a trust list), the connection requested by the sender system is accepted and the message is also accepted—no second phase processing is necessary. However, if the sender network address is determined to be acceptable, but not trusted (e.g., it's on a whitelist, but not on the trust list or any list at all), the multi-list evaluator obtains the domain of the sender email address from the envelope and runs the domain through another series of matches in the second phase. If the sender network address is determined to be on a blacklist, the connection is rejected and the processing ends.

The "envelope" is automatically generated by the email software on the sender system and used by mail transport software to route and deliver the email. SMTP usually throws away most of the envelope before it hands the email to an end user's device. Thus, many users are not aware that such an envelope exists. In this case, the email has been received by the ingress server and not yet delivered to an end user's device. Since information contained in the envelope (e.g., a sender email address, a sender server IP address, etc., collectively referred to as SMTP envelope data) is extremely difficult to spoof or fake, the ingress server can leverage information contained in the envelope to perform further evaluations and/or validations.

During the second phase, the multi-list evaluator checks the domain against multiple lists of domains and determines whether the message is to be accepted or rejected. If rejected, the message is not processed for delivery. If accepted, the message is routed for further processing and delivery to the end user's device (e.g., placing in the user's mailbox).

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

Embodiments disclosed herein can provide many advantages. For example, since this validation process is performed on the ingress server when the message is received from the sender system, the ingress server does not need to invoke any external services (e.g., third-party blacklist services) to correct a false-positive error, a process that can take days or more. Rather, embodiments disclosed herein can override third-party blacklists and significantly reduce the hundreds of hours of engineering effort needed to bring the server back on track to mere minutes. Accordingly, embodiments disclosed herein can reduce false-positives and minimize service interruptions/inconvenience, hence reducing impact on email server performance. Further, embodiments disclosed herein can reduce the time needed to resolve an interruption caused by mistaken blacklisting.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In today's connected world, there exist many network security vulnerabilities. As an example, some sender systems may use an email parser called "emailinject." This parser matches email destinations with an inbound number and does not require that the sending email address be registered. Accordingly, messages coming into this parser can cause the render servers to receive viruses (e.g., the "locky" virus—a ransomware malware released in 2006). This kind of email injection poses a security vulnerability that can occur in network applications used to send email messages. Other security vulnerabilities may occur when one programming language is embedded in another. Unfortunately, some viruses (e.g., viruses with day-one signatures) may not be detected by current virus scanners.

A receiver system generally has no control in what email software the sender system uses and/or what mail transport software is involved before a message is received by the receiver system. This lack of control can expose the receiver system to potentially serious security risks. However, in some cases, a receiver system may find that close to 100% of the emails containing viruses had come from IP addresses known to be malicious and present on several blacklist services. Accordingly, to protect the receiver system from such network security vulnerabilities, it may be desirable to leverage blacklist services to reject email messages coming from IP addresses known to be malicious. An example implementation is illustrated in FIG. 1.

Figure 1:
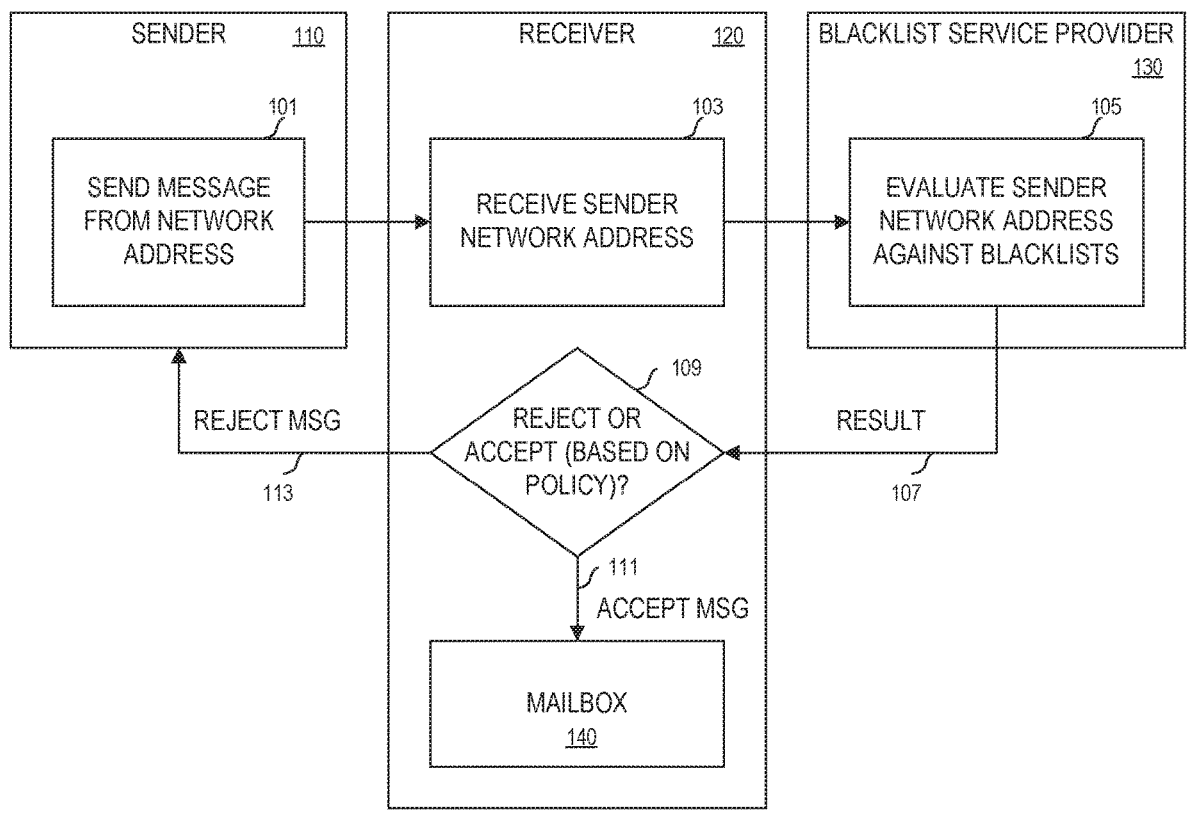
FIG. 1 depicts a diagrammatic representation of a receiver system utilizing a blacklist service to screen messages from a sender system.

FIG. 1 depicts a diagrammatic representation of a receiver system utilizing a blacklist service to screen messages from a sender system in network environment 100. In this example, receiver system 120 may subscribe to services provided by blacklist service provider 130 such that message 101 from sender system 110 is received by mail handler 103 at receiver system 120 and checked against blacklists 105 maintained by blacklist service provider 130 outside of receiver system 120. Blacklist service providers are known to those skilled in the art and thus are not further described herein. Result 107 from blacklist service provider 130 is then used by decision process 109 of receiver 120 to determine whether to accept the message (111) or to reject the message (113). If the message is accepted, it is placed in mailbox 140. If the message is rejected, an error message may be returned to sender system 110.

The example implementation illustrated in FIG. 1 has some drawbacks. For example, it can take a long time (e.g., days or even longer) to get a result back from a blacklist service provider that operates external to the receiver system. Further, it may not scale well when the receiver system encompasses an Enterprise Information Management (EIM). More importantly, if a sender's email address is somehow blacklisted (e.g., when result 107 from blacklist service provider 130 represents a false-positive error), the receiver system has no way to immediately correct the error internally and all the emails from the sender's email address will be blocked until this error is corrected externally (e.g., by blacklist service provider 130 de-listing or removing the sender's email address from blacklists 105).

Embodiments disclosed herein can provide an EIM system with the ability to recognize inbound messages from malicious IP Addresses and discard them and to decrease the vulnerability of the render servers to day-one viruses and other viruses. Before going into details in describing these embodiments, an overview of an EIM system may be helpful.

Traditional information exchange methods have long implemented on an ad hoc arrangement of fragmented network systems that do not communicate with one another. This ad hoc arrangement can increase costs and security risks while slowing down information exchange transactions. Contrastingly, EIM systems enable enterprises to secure their information across the diverse and complex landscapes of organizational departments, legacy systems, corporate and regulatory policies, enterprise content, and unstructured big data. This complex connected approach allows enterprises to manage their content throughout its lifecycle and reduce governance and security risks and costs. To facilitate efficient, secure, and compliant exchange of information inside and outside of an enterprise, an EIM system generally has a set of complex network solutions that integrates messaging and Business-to-Business (B2B) integration services such as secure mail, large file transfer, fax, and Electronic Data Interchange (EDI) within a single platform.

Figure 2:
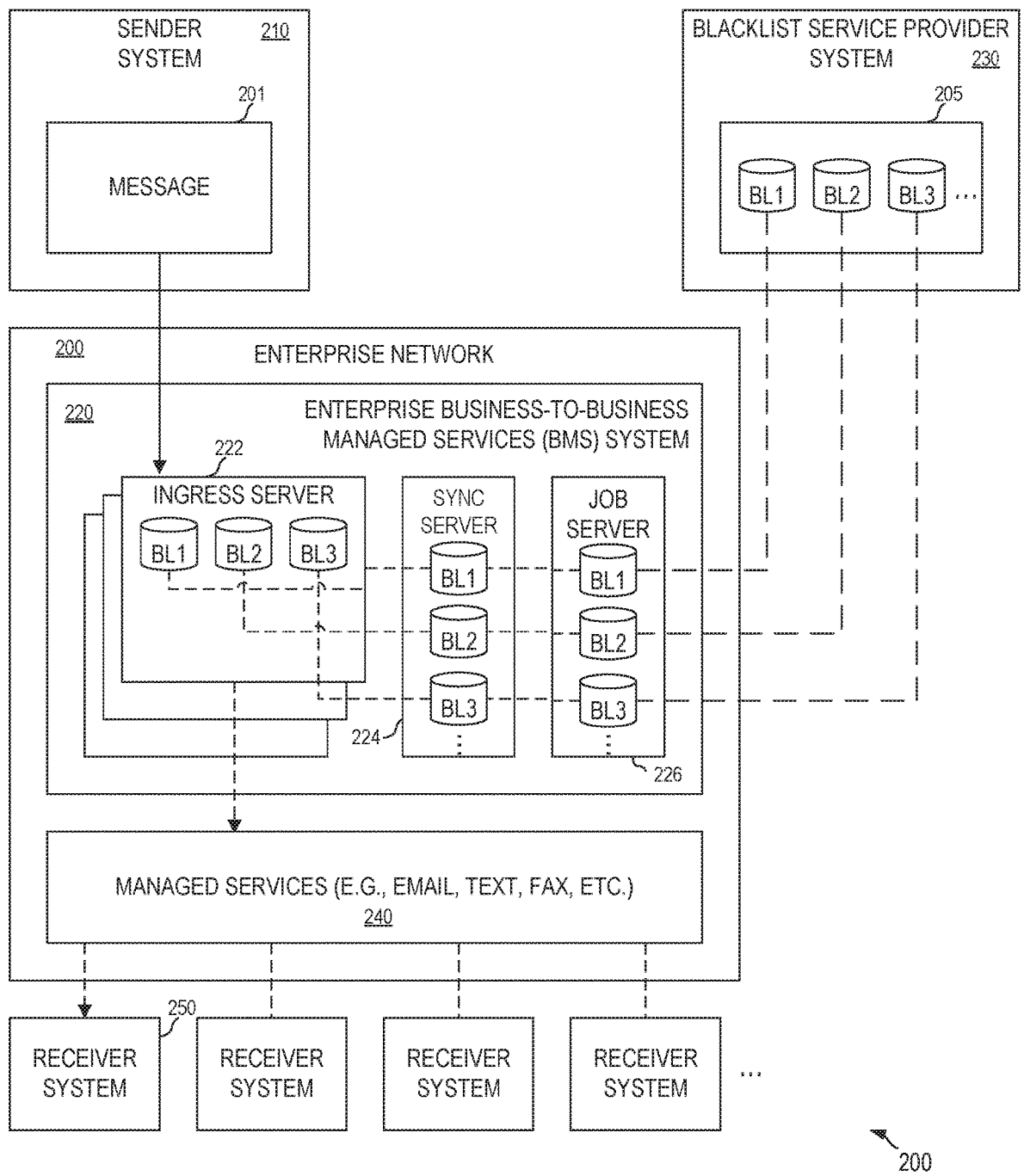
FIG. 2 depicts a diagrammatic representation of an enterprise network computing environment including ingress servers where embodiments disclosed herein may be implemented.

In this context, it may be especially important for an EIM system to mitigate or avoid any delays or disruptions in providing these B2B managed services (e.g., email service, fax service, email-to-fax service, etc., collectively referred to as BMS). FIG. 2 illustrates an example of a BMS system operating in an enterprise network computing environment as part of an EIM system according to some embodiments.

In the example of FIG. 2, BMS system 220 may operate in enterprise network 200 for providing managed services 240 to customer systems such as sender system 210 and receiver system 250 operating in network environment 200. To protect enterprise data and customer data, BMS system 220 may be communicatively connected to a blacklist supplier (e.g., blacklist service provider system 230).

Blacklist service provider system 230 may maintain blacklists 205 (e.g., a sender blacklist, a domain blacklist, a policy blacklist, etc., represented in FIG. 2 as BL1, BL2, BL3, . . . ). Blacklist service provider system 230 may provide blacklists 205 as Real-time Blacklists (RBLs) that are continuously updated with new threat sources. The RBLs are usually configured as a Domain Name Service (DNS) so that a mail gateway can query the source address or domain and decide whether to accept messages.

In this case, blacklists 205 can be provided by blacklist service provider system 230 (e.g., via DNS queries) to a designated server (e.g., job server 226) of BMS system 220. Job server 226 may store blacklists 205 locally for use by an in-network sync server 224. In this example, sync server 224 is a BMS server that has access to BMS email ingress servers (e.g., ingress servers 222) that serve as entry points for emails from the world external to enterprise network 200. Sync server 224 may synchronize blacklists (e.g., blacklists 205) from a blacklist supplier server or a designated server (e.g., job server 226) and store them locally for use by in-network, customer-facing ingress servers 222.

In some embodiments, ingress servers 222 can reside in a demilitarized zone (DMZ). A DMZ refers to a physical or logical subnetwork where external-facing servers, such as a web server, reside. Ingress servers 222 are configured as entry points into enterprise network 200 and are operable to determine whether messages from customer systems external to enterprise network 200 are to be trusted, accepted, or rejected. Ingress servers 222 do not open messages. Accordingly, ingress servers 222 do not operate based on content contained in the incoming messages.

As an example, responsive to receiving message 201 from sender system 210, ingress server 222 may operate to process message 201 and determine whether to accept or reject message 201. Notice that blacklist service provider system 230 do not provide whitelists. In the past, this means that, if the email address used by sender system 210 to send message 201 is somehow blacklisted by blacklist service provider system 230, message 201 and any messages from the email address will be rejected/blocked from delivery, even if the email is not a spam or malicious. This is referred to as a false-positive error.

Since blacklists 205 are maintained by a vendor or third party (e.g., an operator of blacklist service provider system 230) and synced to BMS system 220, only the vendor has the ability to correct this error—a process that can take days or even more as the vendor has to be contacted to remove the incorrect entry from their blacklists 205. Until the incorrect entry is removed from blacklists 205 hosted by blacklist service provider system 230, messages from sender system 210 will continue to be rejected by BMS system 220. The process of removing the incorrect entry from blacklists 205 can take days, sometimes weeks. In the meantime, BMS services provided to this falsely blacklisted email address are interrupted or otherwise delayed for days on end. That is, valid messages from a distressed customer (e.g., an entity owning or operating sender system 210) will be rejected by BMS system 220 for a significant time period. This will cause not only cost significant reduction in performance and loss of revenue, but could potentially lose the dissatisfied customer entirely.

Previously, BMS system 220 had no way of mitigation or avoiding disruptions caused by such false-positives. Embodiments disclosed herein provide a way to override, in a matter of mere minutes, blacklists 205 and eliminate the significant delays usually associated with correcting false-positives. In some embodiments, a mail filter (referred to herein as a milter) is specially programmed with checks for validating incoming messages against internally maintained whitelists and blacklists. Vendor blacklists (e.g., blacklists 205 that are synced from third-party blacklist service provider system 230) may also be utilized, but only for messages that cannot be trusted (but may still be accepted).

Figure 3:
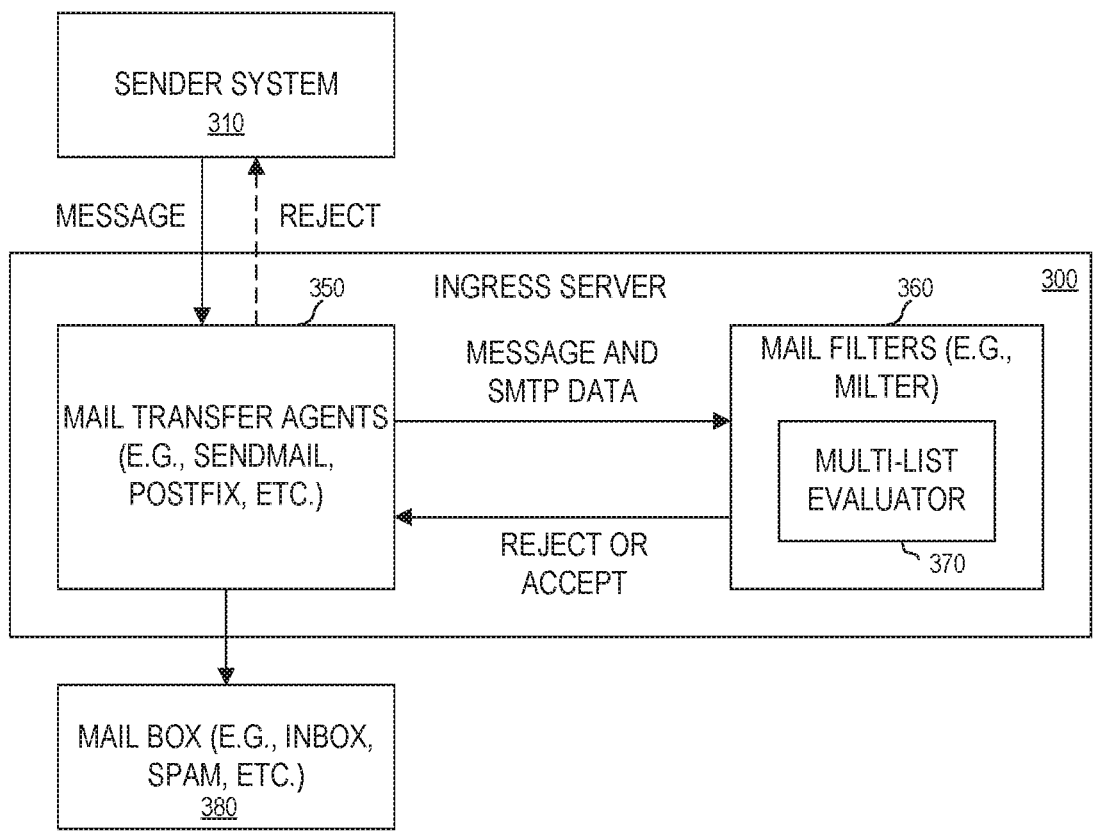
FIG. 3 depicts a diagrammatic representation of an ingress server including a milter where embodiments disclosed herein may be implemented.

FIG. 3 depicts a diagrammatic representation of an ingress server where embodiments disclosed herein may be implemented. As a non-limiting example, milter 360 can reside on ingress server 300 and work with mail transfer agents (MTA) 350 that also reside on ingress server 300 to process messages received from sender systems (e.g., sender system 310) over SMTP. As a non-limiting example, MTA 350 may implement sendmail, which is an industry standard MTA known to those skilled in the art.

Generally, ingress server 300 gets three types of information over SMTP in the following order. First, ingress server 300 gets a sender network address (which is an IP address) from a sender's network infrastructure (e.g., networking software which can be part of the operating system of the sender's computer) when it's attempting to make a connection to deliver a message. Once the connection is made, envelopes of messages start to arrive at ingress server 300 (e.g., through handshaking between the two systems). An envelope contains SMTP envelope data such as a sender's email address and a recipient's email address. Unlike physical envelopes, an email envelope arrives at ingress server 300 before the email (e.g., a header and a body) arrives at ingress server 300. The header typically contains the display name (e.g., the name of the sender and header address(es)) that is later used by the recipient's email software to display the email. The header addresses are addresses displayed by user interfaces. These may or may not be the same as envelope addresses (because envelope addresses cannot be spoofed, but header addresses may).

In this example, a connection request from an enterprise customer's server (e.g., sender system 310) is received by MTA 350. The connection request can contain an IP address of the requesting server. This is referred to as a sender network address. As a non-limiting example, a sender network address can be a numerical label assigned to a device connected to a computer network that uses the IP for communication. MTA 350 sends the sender network address to milter 360.

Multi-list evaluator 370 of milter 360 is operable to first determine, based on the sender network address, whether to trust, accept, or reject the connection request. If the sender network address can be trusted (e.g., it is found on a trust list), multi-list evaluator 370 is operable to indicate to MTA 350 to accept the connection request as well as the message. No further validation of the message is necessary If the sender network address can be accepted, but not trusted (e.g., it is not found on any list at all or it is not on the trust list, but it is on a whitelist or matches an entry in a hosts file), multi-list evaluator 370 is operable to indicate to MTA 350 to accept the connection request (i.e., the sender network address is validated). However, at this time, the message is not yet accepted. MTA 350 sends SMTP envelope data to multi-list evaluator 370 for further evaluation and validation.

The SMTP envelope data from the envelope may include a sender email address. The sender email address from the envelope (also referred to as a sender envelope address) usually has two parts—a local part and a domain part connected by the symbol "@" (e.g., local-part@domain). The local part of an email address identifies a name of a mailbox and the domain part of the email address identifies a name of a domain from where the email is generated. Multi-list evaluator 370 is operable to validate or invalidate the message using the domain obtained from the envelope and indicate to MTA 350 whether to reject or accept the message.

Figure 4:
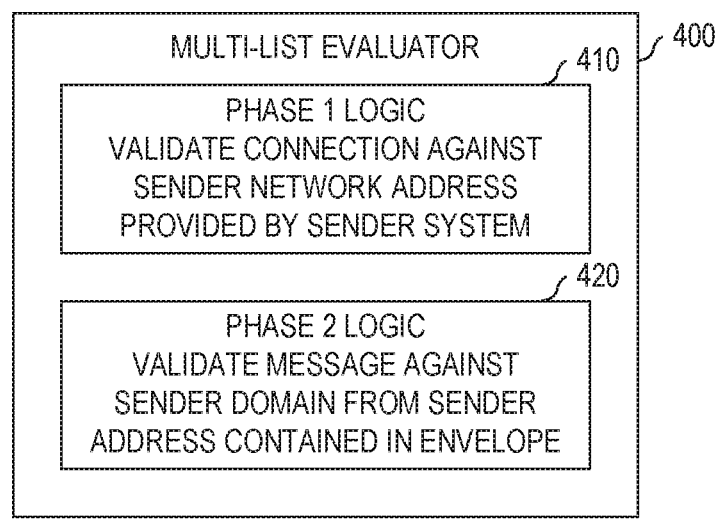
FIG. 4 depicts a diagrammatic representation of a milter embedded with a multi-list evaluator that implements a two-phase logic for validating incoming messages according to some embodiments.

Multi-list evaluator 370 running within milter 360 may implement a two-phase logic for performing these operations. FIG. 4 depicts a diagrammatic representation of a milter having a multi-list evaluator 400 that implements a two-phase logic for validating incoming messages according to some embodiments. In this example, multi-list evaluator 400 may perform various checks in two phases—phase 410 and phase 420.

In some embodiments, in phase 410, multi-list evaluator 400 is operable to compare a sender network address (which, as described above, can be an IP address of a sender's server that initiated the connection to an SMTP server such as MTA 350 to submit messages) in a first series of checks against a selection of lists and determine whether the sender network address, with which a connection is to be made, can be trusted, accepted but not trusted, or rejected. If rejected, no connection is made. If trusted, the connection is made and the message is accepted automatically and routed to subsequent stages for further processing and delivery to the end user's device (e.g., in the user's mailbox).

If the sender network address is determined by multi-list evaluator 400 to be acceptable, but not trusted (and also not rejected), multi-list evaluator 400 can obtain the domain of the sender email address from the envelope and run the domain through another series of checks in phase 420 and determine whether the message is to be accepted or rejected. If rejected, the message is not processed for delivery. If accepted, the message is routed to subsequent stages for further processing and delivery to the end user's device.

An example of address lists that can be used by multi-list evaluator 400 in phases 410 and 420 is provided in Table 1 below.

TABLE 1

| list | Name | Description |
|---|---|---|
| NATL | Network Address Trusted List | Network addresses belonging to and certified by an enterprise customer |
| NAWL | Network Address Whitelist | Network addresses from known enterprise customers |
| NABL | Network Address Blacklist | Network addresses known to be sources of malware |
| DWL | Domain Whitelist | sender domains of known enterprise customers or entities |
| DBL | Domain Blacklist | sender domains known to be sources of malware |
| SBL | Service Provider Blacklist of IP addresses and subnets | provided by a blacklist supplier |
| SDBL | Service Provider Domain blacklist | provided by a blacklist supplier |
| HOSTS | The /etc/inet/hosts file on the server | entries are treated as whitelists |

Figure 5:
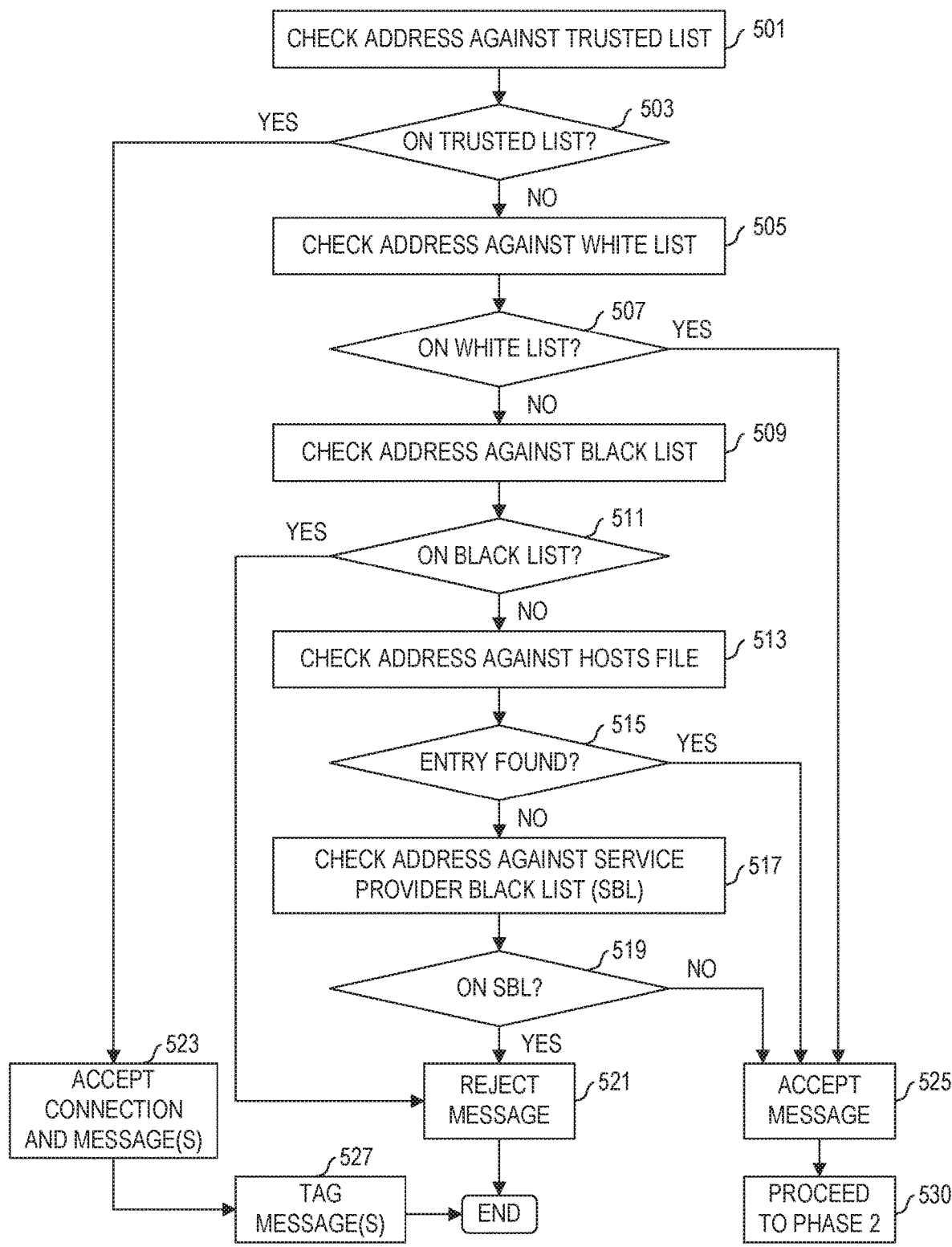
FIG. 5 depicts a flow diagram for an example of the first phase of validation performed by the multi-list evaluator according to some embodiments.

FIG. 5 depicts a flow diagram for an example of phase I logic 500 for the first phase of validation performed by a multi-list evaluator according to some embodiments. In some embodiments, the sender network address is checked against an internal (e.g., internal to a milter, an ingress server, a BMS system, or an enterprise network where logic 500 is implemented) trusted list (e.g., NATL) (501). If the sender network address is found on the internal trust list (503), the connection is accepted and the message is also accepted without any further validation (523). All messages for the same SMTP connection session are accepted without any further validation as well. An SMTP session refers to an uninterrupted connection initiated by an SMTP client to an SMTP server to submit messages. Multiple messages may be submitted by the client to the server in a single SMTP session.

If the sender network address is not found on the internal trust list, the sender network address is checked against an internal whitelist (e.g., NAWL) (505). If the sender network address is found on the internal whitelist (507), the connection is accepted, but not trusted (525).

If the sender network address is not found on the internal whitelist, the sender network address is checked against an internal blacklist (e.g., NABL) (509). If the sender network address is found on the internal blacklist (511), the connection is rejected (521). No envelope or message is received.

If the sender network address is not found on the internal blacklist, the sender network address is checked against an internal hosts file (e.g., HOSTS) (513). If the sender network address is found in the internal hosts file (515), the connection is accepted, but not trusted (525).

If the sender network address is not found in the internal hosts file, the sender network address is checked against a service provider's blacklist of IP addresses (SBL) (517). As described above, the SBL is typically maintained externally by a vendor or a third-party blacklist supplier and synced to server computers operating in the enterprise network (e.g., through a dedicated job server, a sync server, and ultimately to each ingress server in the enterprise network). If the sender network address is found on the SBL (519), the connection is rejected (521). No envelope or message is received.

If the sender network address is not found on the SBL, the connection is accepted, but not trusted (525). When a connection is accepted, but not trusted, the multi-list evaluator proceeds to the next phase of evaluation (530).

In some embodiments, the above-described process can be logged in a milter log. The milter log can show the reason for acceptance/rejection during the connection phase (e.g., FIG. 5) as reason=<list>:

12:27:15 06 [13594/4] Accepting conn on labs1 from dev15.greatsecurity.com/100.236.1.00, port=12345, reason=NOBL 12:27:16 11 [13594/4] Greetings from awesomedigit.com Log entries such as these are not attached to the message. In some embodiments, a tag may optionally be inserted as a header in the message (527). This tag, which is further explained below, does not affect the body of the message, but provides a trace of when and why the message was accepted. This tagging only takes place after the entire message is accepted. By then, the ingress server has completed its security check.

Figure 6:
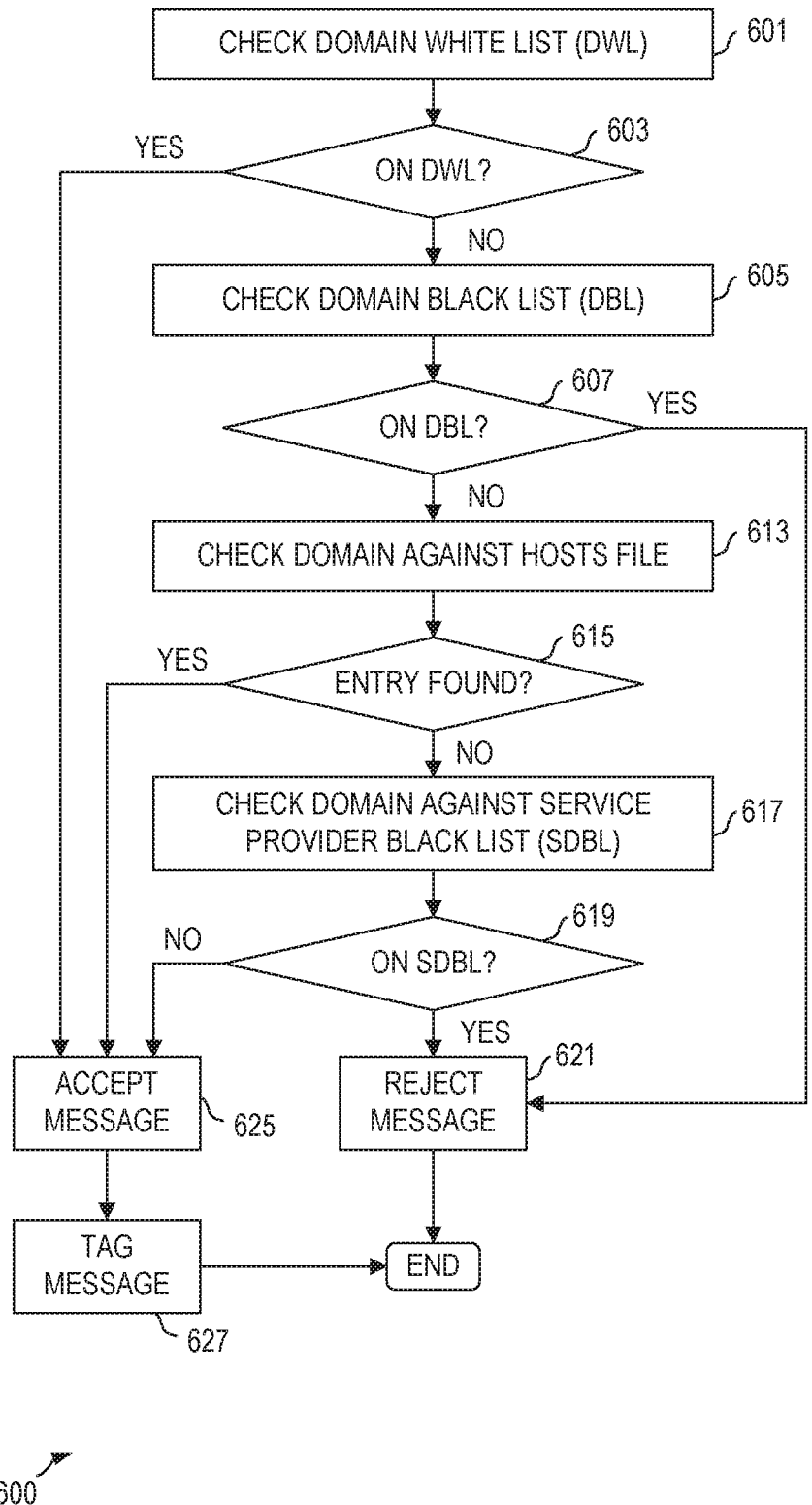
FIG. 6 depicts a flow diagram for an example of the second phase of validation performed by the multi-list evaluator according to some embodiments.

FIG. 6 depicts a flow diagram for an example of phase II logic 600 for the second phase of validation performed by a multi-list evaluator according to some embodiments. In some embodiments, the domain of the sender email address obtained from the envelope is checked against an internal domain whitelist (e.g., DWL) (601). If the domain of the sender email address obtained from the envelope is found on the internal domain whitelist (603), the message is accepted without any further validation (625). Optionally, the message is tagged (627).

If the domain of the sender email address obtained from the envelope is not found on the internal domain whitelist, the domain of the sender email address obtained from the envelope is checked against an internal domain blacklist (e.g., DBL) (605). If the domain of the sender email address obtained from the envelope is found on the internal domain blacklist (607), the message is rejected (621).

If the domain of the sender email address obtained from the envelope is not found on the internal domain blacklist, the domain of the sender email address obtained from the envelope is checked against an internal hosts file (e.g., HOSTS) (613). If the domain of the sender email address obtained from the envelope matches any entry in the internal hosts file (615), the message is accepted (625).

If the domain of the sender email address obtained from the envelope does not match any entry in the internal hosts file, the domain of the sender email address obtained from the envelope is checked against a service provider's blacklist for domains known to be sources of malware, spam, or other security risks (e.g., SDBL) (617). If the domain of the sender email address obtained from the envelope is found on the SDBL (619), the message is rejected (621).

If the domain of the sender email address obtained from the envelope is not found on the SDBL, the message is accepted. Although not shown in FIG. 6, in some embodiments, an additional check may be performed to determine whether the sender's domain is registered with the BMS system.

In some embodiments, the above-described process can also be logged in a milter log.

The milter log can show the reason for acceptance/rejection during the envelope check (e.g., FIG. 6) as reason=<list>. For example:

12:27:16 06 [13594/4] Accepting envlp #1, msgFrom <tester@easylink.com> qID v27HRF8B013613, reason DWL

12:27:16 06 [13594/4] rcptTo[1]<11111111111@faxmail.com>

Again, these log entries are not attached to the message. Rather, they can be viewed by a user who logs into the ingress server on which the milter is run.

In some embodiments, each message that is accepted is tagged with two reason codes, one for indicating a reason of acceptance pertaining to the sender network address and one for indicating a reason of acceptance pertaining to the domain of the sender email address. As a non-limiting example, Table 2 and Table 3 below provide sample reason codes for these two different reasons.

TABLE 2

| tag | explanation |
|---|---|
| NATL | the network address matches an entry in NATL list |
| NAWL | the network address matches an entry in NAWL list |
| HOSTS | the address is in the hosts file of the server |
| NOBL | the address was not in any blacklist |

TABLE 3

| tag | explanation |
|---|---|
| TRUST | message on a connection that is trusted |
| DBL | domain name is in DBL list |
| HOSTS | domain name is in hosts file on server |
| NOBL | domain name is not in any blacklist |

When a message is accepted, a new mail header having the following structure is added by the milter:

X-ESIC-MILBLD: QueueID on hostname accepted RSN1:RSN2 at timestamp where:

QueueID is the MTA queue-id hostname is the name of the host on which the message was accepted RSN1 is a tag for the Reason the connection was accepted (details below)

RSN2 is a tag for the Reason the message was accepted (details below)

timestamp when the message was accepted

RSN1:RSN2 represent the acceptance/rejection reasons for each phase. As a non-limiting example, a mail head may be added as follows:

X-ESIC-MILBLD: v27HRF8B013613 labs1 NOBL:DWL 20170307T172716Z

In this example, at phase 1, the connection was accepted because the sender network address is not on any blacklist (NOBL) and, at phase 2, the message was accepted because the domain of the sender email address from the envelope is on an internal whitelist (e.g., DWL).

Possible tag combinations for accepted messages can include: NATL:TRUST, NAWL:HOSTS, HOSTS:HOSTS, HOSTS:NOBL, NOBL:HOSTS, NOBL:NOBL, and NAWL:NOBL. Possible tag combinations, which would only be found in the logs, for rejected messages can include: NAWL:DBL, HOSTS:DBL, and NOBL:DBL.

In some embodiments, each message that is accepted and tagged with these reason codes is routed or passed on to a downstream computing facility or subsequent stage(s) for further processing and mail delivery to an end user, for instance, at a receiver system. For each message that is rejected, a message processing trace log may be written to record why the message, or a SMTP connection associated with the message, was rejected. The logged information is not included in the message. The specific logging format can depend on implementation. The logged information can be useful for diagnostic purposes.

As described above, embodiments disclosed herein can provide many advantages. For example, leveraging real-time blacklists (RBLs) provided by blacklist suppliers to validate incoming messages can significantly minimize the risk of malware from infecting a complex enterprise network. However, purely relying on third-party blacklist suppliers to provide RBLs does not eliminate the possibility of valid messages or domains being somehow falsely blacklisted. Thus, false-positive errors are a real concern, and since the usual procedure to remedy such false-positives is very time consuming, these errors disrupt services provided by the underlying system and degrade system performance. To prevent such disruptions, and also to speed up the validation process, especially for large trusted sender systems, new address lists are introduced and the validation process is enhanced in embodiments disclosed herein. The additional step of ensuring that the sender's domain is registered can reduce spurious and malicious messages even further. Accordingly, embodiments may drastically reduce the time for false-positive remediation from days to a couple of minutes. Further, additional trusted lists can reduce the processing time and improve system throughput.

Figure 7:
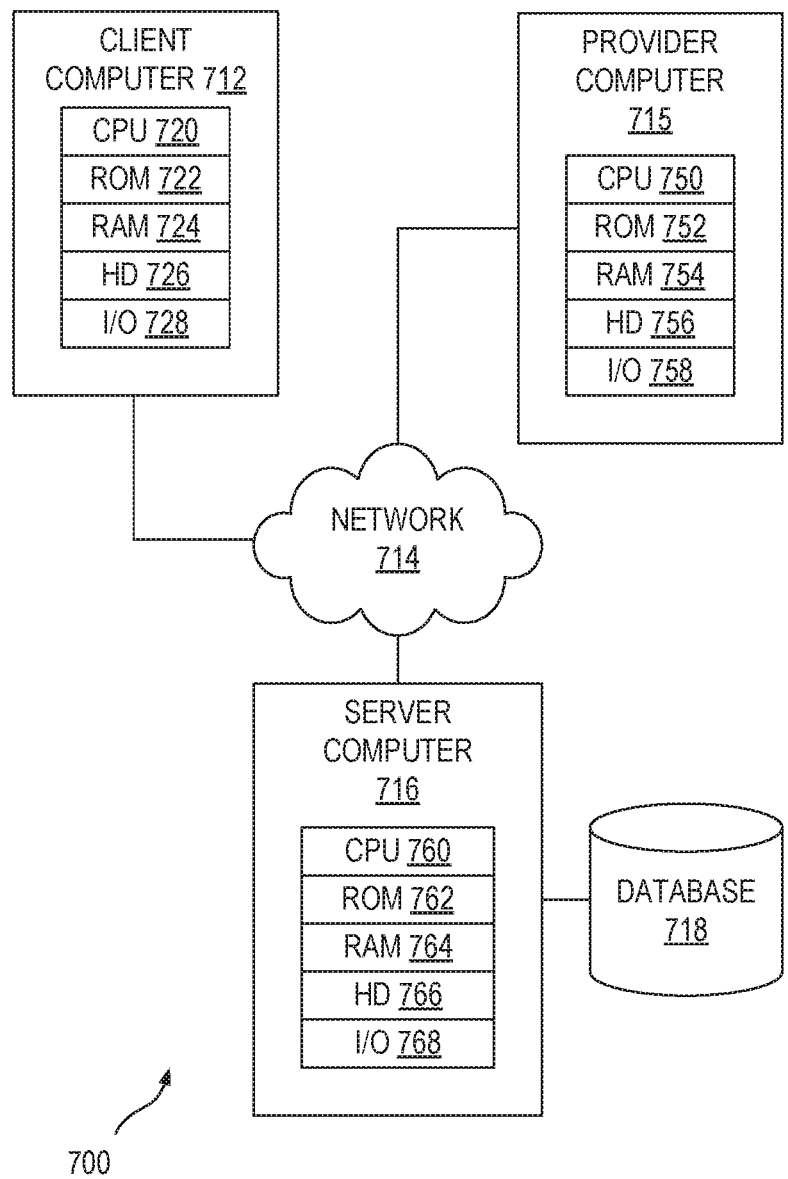
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to computer 712, computer 715, and computer 716. Computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of computer 712, computer 715, and computer 716. However, with each of computer 712, computer 715, and computer 716, a plurality of computers (not shown) may be interconnected to each other over network 714. For example, a plurality of computers 712 and a plurality of computers 715 may be coupled to network 714. Computers 712 may include data processing systems for communicating with computer 716. Computers 715 may include data processing systems for providing blacklists to computer 716.

First enterprise computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network. Computer 715 may be similar to computer 712 and can comprise CPU 750, ROM 752, RAM 754, HD 756, and I/O 758.

Likewise, computer 716 may include CPU 760, ROM 762, RAM 764, HD 766, and I/O 768. Computer 716 may include one or more backend systems configured for providing a variety of services (e.g., an email-to-fax service) to computers 712 over network 714. These services may utilize data stored in data store 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method, comprising:
   receiving, by an ingress server computer of a computer network a request for connection from a sender system, the sender system having a sender network address;
   comparing, by the ingress server computer, the sender network address with a plurality of lists of addresses without receiving an envelope and an associated message from the sender system;
   determining, by the ingress server computer based on the comparing, whether to trust the sender system and accept the request for connection from the sender system, to accept the request for connection from the sender system but not trust the sender system, or to reject the request for connection from the sender system;
   when it is determined to accept the request for connection from the sender system but not trust the sender system, accepting, by the ingress server, the request for connection and receiving the envelope from the sender system but not accepting the message associated with the envelope, the envelope from the sender system containing a sender email address, the sender email address containing a domain;
   comparing, by the ingress sever, the domain of the sender email address from the envelope with a plurality of lists of domains, the plurality of lists of domains including a whitelist, without opening the message; and
   responsive to a determination that the domain of the sender email address from the envelope is found on the whitelist of the plurality of lists of domains or a determination that the domain of the sender email address from the envelope is not found on any of the plurality of lists of domains, accepting, by the ingress server, the message from the sender system and routing the message to the end user's device.

2. The method according to claim 1, further comprising:
   logging, in a log maintained by the ingress server, a reason of rejection or acceptance of the request for connection from the sender system; and
   logging, in the log maintained by the ingress server, a reason of rejection or acceptance of the message from the sender system.

3. The method according to claim 1, wherein the plurality of lists of addresses includes a trusted list of addresses maintained by the ingress server, a whitelist of addresses maintained by the ingress server, a blacklist of addresses maintained by the ingress server, and a blacklist maintained by a blacklist service provider system operating outside of the computer network.

4. The method according to claim 1, wherein the plurality of lists of domains includes the whitelist maintained by the ingress server, a domain blacklist maintained by the ingress server, and a domain blacklist maintained by a blacklist service provider system operating outside of the computer network.

5. The method according to claim 1, further comprising:
   tagging the message with a reason for accepting the request for connection from the sender system and a reason for accepting the message based on the domain of the sender email address from the envelope of the message.

6. The method according to claim 1, further comprising:
   responsive to a determination to trust the sender system and accept the request for connection from the sender system, receiving the message from the sender system and routing the message to a receiver system.

7. The method according to claim 1, further comprising:
   responsive to a determination to reject the request for connection from the sender system, denying the request for connection such that no envelope or message is received by the ingress server.

8. A system, comprising:
   a processor;
   a non-transitory computer-readable medium; and
   stored instructions translatable by the processor to perform, at an ingress server computer of a computer network:
     receiving a request for connection from a sender system, the sender system having a sender network address;
     comparing the sender network address with a plurality of lists of addresses without receiving an envelope and an associated message from the sender system;
     determining, based on the comparing, whether to trust the sender system and accept the request for connection from the sender system, to accept the request for connection from the sender system but not trust the sender system, or to reject the request for connection from the sender system;
     when it is determined to accept the request for connection from the sender system but not trust the sender system, accepting the request for connection and receiving the envelope from the sender system but not accepting the message associated with the envelope, the envelope from the sender system containing a sender email address, the sender email address containing a domain;
     comparing the domain of the sender email address from the envelope with a plurality of lists of domains, the plurality of lists of domains including a whitelist, without opening the message; and responsive to a determination that the domain of the sender email address from the envelope is found on the whitelist of the plurality of lists of domains or a determination that the domain of the sender email address from the envelope is not found on any of the plurality of lists of domains, accepting, by the ingress server, the message from the sender system and routing the message to the end user's device.

9. The system of claim 8, wherein the stored instructions are further translatable by the processor to perform:
   logging, in a log maintained by the ingress server, a reason of rejection or acceptance of the request for connection from the sender system; and
   logging, in the log maintained by the ingress server, a reason of rejection or acceptance of the message from the sender system.

10. The system of claim 8, wherein the plurality of lists of addresses includes a trusted list of addresses maintained by the ingress server, a whitelist of addresses maintained by the ingress server, a blacklist of addresses maintained by the ingress server, and a blacklist maintained by a blacklist service provider system operating outside of the computer network.

11. The system of claim 8, wherein the plurality of lists of domains includes the whitelist maintained by the ingress server, a domain blacklist maintained by the ingress server, and a domain blacklist maintained by a blacklist service provider system operating outside of the computer network.

12. The system of claim 8, wherein the stored instructions are further translatable by the processor to perform:
   tagging the message with a reason for accepting the request for connection from the sender system and a reason for accepting the message based on the domain of the sender email address from the envelope of the message.

13. The system of claim 8, wherein the stored instructions are further translatable by the processor to perform:
   responsive to a determination to trust the sender system and accept the request for connection from the sender system, receiving the message from the sender system and routing the message to a receiver system.

14. The system of claim 8, wherein the stored instructions are further translatable by the processor to perform:
   responsive to a determination to reject the request for connection from the sender system, denying the request for connection such that no envelope or message is received by the ingress server.

15. A computer program product comprising a non-transitory computer-readable medium storing instructions translatable by a processor to perform, at an ingress server of a computer network:
   receiving a request for connection from a sender system, the sender system having a sender network address;
   comparing the sender network address with a plurality of lists of addresses without receiving an envelope and an associated message from the sender system;
   determining, based on the comparing, whether to trust the sender system and accept the request for connection from the sender system, to accept the request for connection from the sender system but not trust the sender system, or to reject the request for connection from the sender system;
   when it is determined to accept the request for connection from the sender system but not trust the sender system, accepting the request for connection and receiving the envelope from the sender system but not accepting the message associated with the envelope, the envelope from the sender system containing a sender email address, the sender email address containing a domain;
   comparing the domain of the sender email address from the envelope with a plurality of lists of domains, the plurality of lists of domains including a whitelist, without opening the message; and
   responsive to a determination that the domain of the sender email address from the envelope is found on the whitelist of the plurality of lists of domains or a determination that the domain of the sender email address from the envelope is not found on any of the plurality of lists of domains, accepting, by the ingress server, the message from the sender system and routing the message to the end user's device.

16. The computer program product of claim 15, wherein the instructions are further translatable by the processor to perform:
   logging, in a log maintained by the ingress server, a reason of rejection or acceptance of the request for connection from the sender system; and
   logging, in the log maintained by the ingress server, a reason of rejection or acceptance of the message from the sender system.

17. The computer program product of claim 15, wherein the plurality of lists of addresses includes a trusted list of addresses maintained by the ingress server, a whitelist of addresses maintained by the ingress server, a blacklist of addresses maintained by the ingress server, and a blacklist maintained by a blacklist service provider system operating outside of the computer network.

18. The computer program product of claim 15, wherein the plurality of lists of domains includes the whitelist maintained by the ingress server, a domain blacklist maintained by the ingress server, and a domain blacklist maintained by a blacklist service provider system operating outside of the computer network.

19. The computer program product of claim 15, wherein the instructions are further translatable by the processor to perform:
   tagging the message with a reason for accepting the request for connection from the sender system and a reason for accepting the message based on the domain of the sender email address from the envelope of the message.

20. The computer program product of claim 15, wherein the instructions are further translatable by the processor to perform:
   responsive to a determination to trust the sender system and accept the request for connection from the sender system, receiving the message from the sender system and routing the message to a receiver system.

* * * * *